US006938919B2

(12) United States Patent
Abe

(10) Patent No.: US 6,938,919 B2
(45) Date of Patent: Sep. 6, 2005

(54) OCCUPANT LEG PROTECTION SYSTEM

(75) Inventor: Kazuhiro Abe, Shiga (JP)

(73) Assignee: Takata Corporation, Tokyo (JP)

(*) Notice: Subject to any disclaimer, the term of this patent is extended or adjusted under 35 U.S.C. 154(b) by 0 days.

(21) Appl. No.: 10/630,724

(22) Filed: Jul. 31, 2003

(65) Prior Publication Data
US 2004/0026903 A1 Feb. 12, 2004

(30) Foreign Application Priority Data
Aug. 8, 2002 (JP) .................................. 2002-231762

(51) Int. Cl.⁷ ............................................ B60R 21/22
(52) U.S. Cl. ........................... 280/730.1; 280/728.2; 280/752; 280/753
(58) Field of Search ...................... 280/730.1, 728.2, 280/752, 753, 731

(56) References Cited

U.S. PATENT DOCUMENTS

| 3,784,223 A | * | 1/1974 | Hass et al. ............... 280/730.1 |
| 6,712,385 B2 | * | 3/2004 | Enders .................... 280/730.1 |
| 6,715,789 B2 | * | 4/2004 | Takimoto et al. ........ 280/730.1 |

FOREIGN PATENT DOCUMENTS

JP          9-123862          5/1997

* cited by examiner

Primary Examiner—Eric Culbreth
(74) Attorney, Agent, or Firm—Manabu Kanesaka

(57) ABSTRACT

An occupant leg protection system is arranged below a steering column as a protection system for an automobile. The protection system includes an inflatable airbag; a casing for housing the airbag; and a gas generator for inflating the airbag. A recessed section facing the steering column is provided at a backside of the casing.

4 Claims, 2 Drawing Sheets

OCCUPANT LEG PROTECTION SYSTEM

BACKGROUND OF THE INVENTION AND RELATED ART STATEMENT

The present invention relates to an occupant leg protection system for protecting a leg of an occupant in the event of a car crash, and more specifically, relates to a driver leg protection system.

A conventional occupant leg protection system includes a casing provided on a backside of an interior panel in front of a seat, an airbag housed in the casing, and a gas generator for inflating the airbag. In the event of a car crash, the gas generator generates gas, and the gas is supplied to the airbag. The airbag is inflated between the interior panel and a leg of an occupant, so that the occupant's leg is protected.

With reference to FIG. 4, an example of the conventional driver leg protection system will be described. A steering column 1 holds an outer circumference of a steering shaft 3 having a steering wheel 2 at an end thereof. An upper bracket 4 and a lower bracket 5 support the steering column 1 at upper and lower portions thereof in an axial direction.

The upper bracket 4 is fixed to the upper portion of the steering column 1 and supports the upper portion of the steering column 1 such that a flange 4a at an upper end thereof is connected to an upper hanger 7 of a reinforcement member 8 with a bolt. The lower bracket 5 is connected to the lower portion of the steering column 1 and supports the lower portion of the steering column 1 such that the lower bracket 5 is mounted to a vehicle body 6 with a lower hanger 10.

A column shock absorber 11 is provided between the lower bracket 5 and the upper bracket 4 for absorbing a relative displacement between the upper bracket 4 and the lower bracket 5 due to a deformation of the vehicle body 6 when the vehicle is involved in a front collision. The column shock absorber 11 absorbs the displacement of the lower bracket 5 supporting the lower portion of the steering column 1 toward a rear of the vehicle when the vehicle receives a force from the front. The column shock absorber 11 also absorbs the displacement of the upper bracket 4 supporting the upper portion of the steering column 1 toward a front of the vehicle when an occupant collides with the steering wheel 2.

An occupant leg protection system 20 is mounted below the steering column 1. An occupant leg protection system arranged below the steering column 1 has been disclosed in Japanese Patent Publication No. 09-123862. The occupant leg protection system 20 is arranged at a backside of an under panel 22 serving as an interior panel. An airbag 21 is inflated along a front surface of the under panel 22 as indicated by a phantom line to receive a leg of the occupant L.

In a vehicle having the conventional driver leg protection system, it is necessary to provide an appropriate space d between the occupant leg protection system 20 and the steering column 1. With this space, the under panel 22 can retract when the occupant's leg L collides with the airbag 21 and the airbag 21 pushes the under panel 22. Also, it is possible to avoid interference between the occupant leg protection system 20 and the steering column 1 when the steering column 1 retracts so as to compress the column shock absorber 11.

In order to ensure the space d, the occupant leg protection system 20 needs to be arranged considerably below the steering column 1. When a gas generator 25 projects from a backside of the occupant leg protection system 20 vertically below the steering column 1, it is necessary to arrange the occupant leg protection system 20 to accommodate the projection.

Accordingly, it is an object of the present invention to provide an occupant leg protection system arranged at a higher location, or closer to the steering column as opposed to the conventional system.

Further objects and advantages of the invention will be apparent from the following description of the invention.

SUMMARY OF THE INVENTION

According to the present invention, an occupant leg protection system is arranged below a steering column as a protection system for an automobile. The protection system includes an inflatable airbag; a casing for housing the airbag; and a gas generator for inflating the airbag. A recessed section facing the steering column is provided at a backside of the casing.

In such an occupant leg protection system, it is possible to securely provide a distance between the occupant leg protection system and the steering column even when the protection system is arranged at a position higher or closer relative to the steering column by an amount corresponding to the recessed section at the backside of the casing as opposed to a conventional system.

In such an occupant leg protection system, the gas generator is arranged at a position away from the recessed section. As a result, it is possible to eliminate an effect of the gas generator projecting backwardly, so that the occupant leg protection system can be arranged at a position higher or closer relative to the steering column.

According to the present invention, an occupant leg protection system is arranged below a steering column as a protection system for an automobile. The protection system includes an inflatable airbag; a casing for housing the airbag; and a gas generator for inflating the airbag. The gas generator is provided at a position on the casing away from a position facing the steering column.

In such an occupant leg protection system, the gas generator does not interfere the steering column. Therefore, it is possible to arrange the occupant leg protection system at a position higher or closer relative to the steering column as opposed to the conventional system.

DETAILED DESCRIPTION OF PREFERRED EMBODIMENTS

Figure 1:
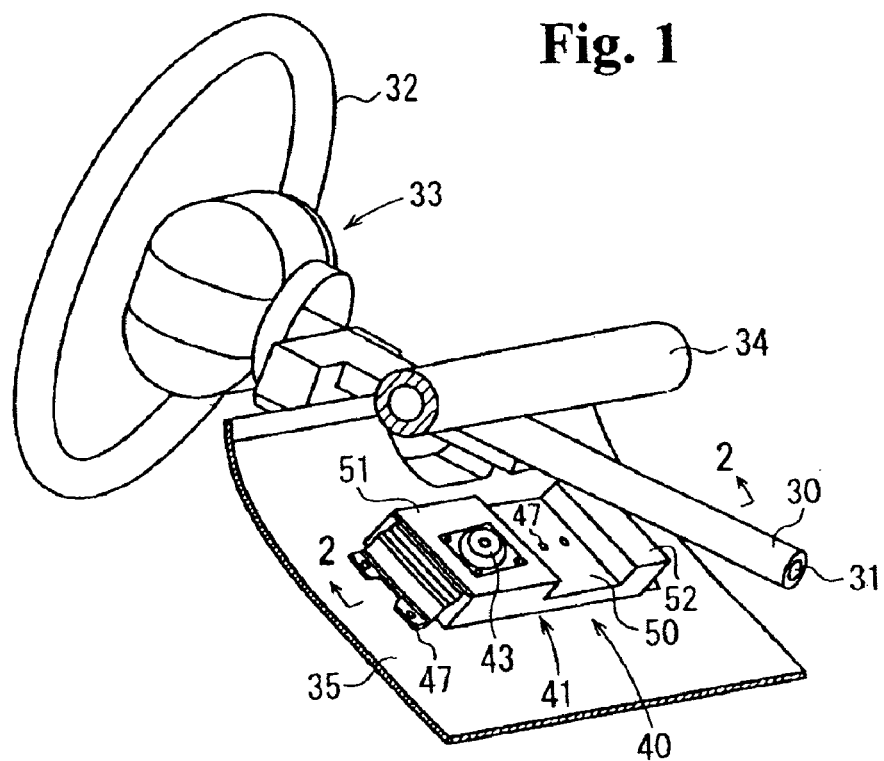
FIG. 1 is a perspective view of a backside of an instrument panel provided with an occupant leg protection system according to an embodiment of the present invention.
Figure 2:
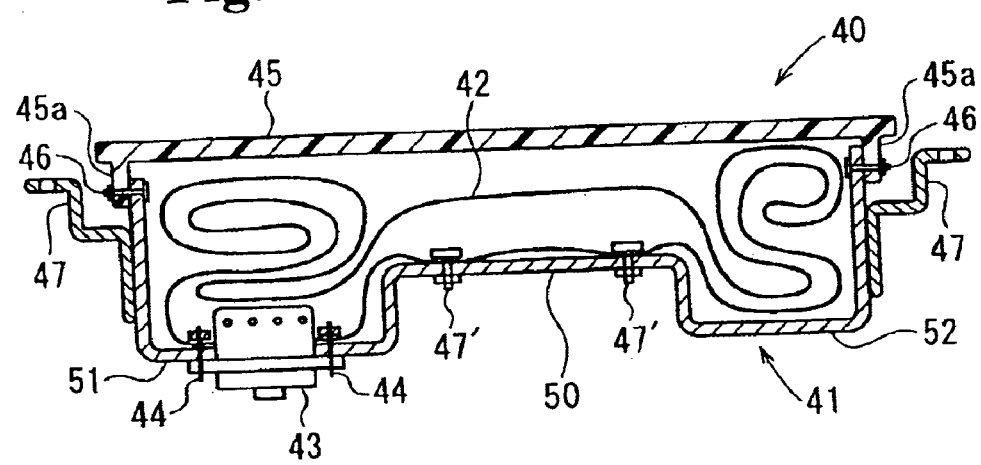
FIG. 2 is a sectional view of the protection system taken along line 2—2 in FIG. 1.

Hereunder, embodiments of the present invention will be described with reference to the accompanying drawings. FIG. 1 is a perspective view of a backside of an instrument panel provided with an occupant leg protection system according to an embodiment. FIG. 2 is a sectional view thereof taken along line 2—2 in FIG. 1.

Figure 3:
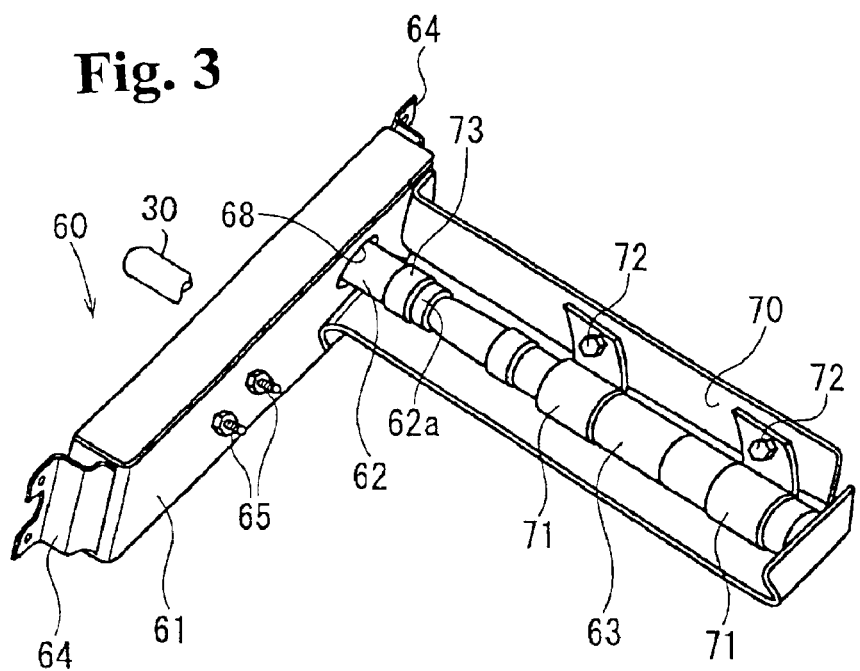
FIG. 3 is a perspective view of an occupant leg protection system seen from a backside according to another embodiment.
Figure 4:
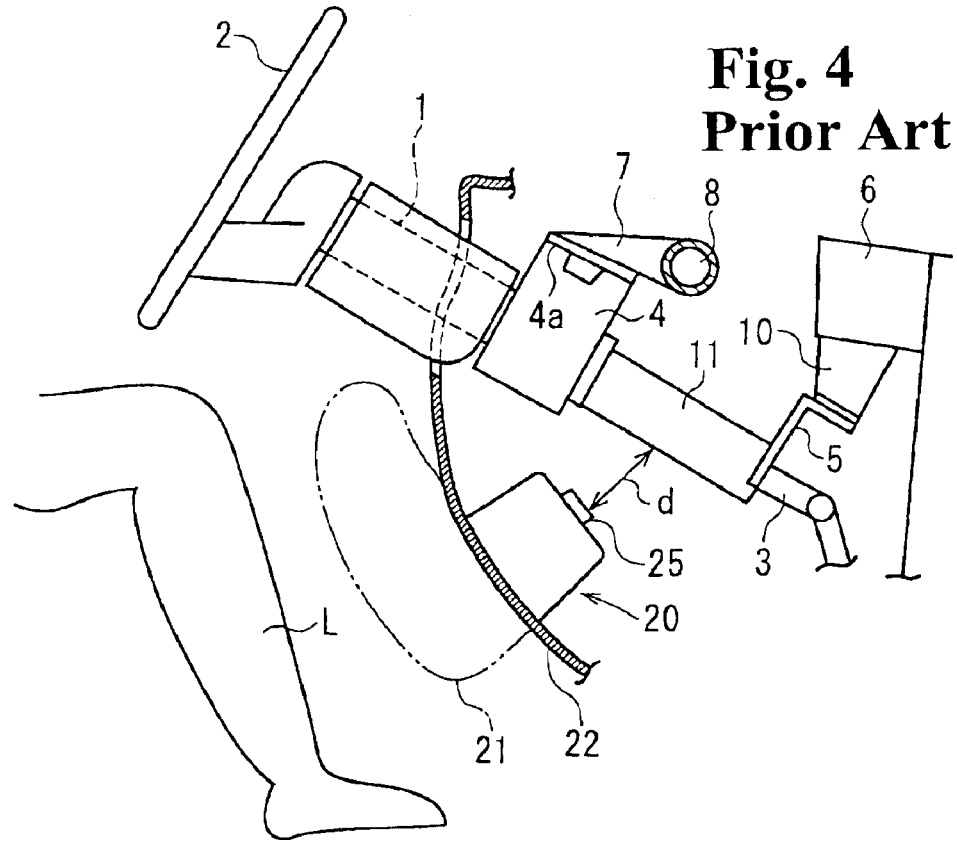
FIG. 4 is an explanatory view of a conventional protection system.

A steering wheel 32 is provided at an end of a steering shaft 31 inserted in a steering column 30 (schematically shown in FIG. 3). A driver seat airbag system 33 is disposed inside the steering wheel 32. An instrument panel reinforcement member 34 extends in a direction crossing the steering column 30 (a width direction of a vehicle).

An under panel 35 is arranged to be flush with the instrument panel, and an occupant leg protection system 40 is disposed at a backside of the under panel 35. The occupant leg protection system 40 includes a container-like casing 41 having an opening at a front surface (adjacent to an occupant), an airbag 42 housed in the casing 41 in a folded state, and a gas generator 43 for inflating the airbag 42. The gas generator 43 and a rim of a gas inlet port of the airbag 42 are fixed to the casing 41 with a fastening member 44.

The front opening of the casing 41 is covered with a cover 45. The cover 45 is arranged to be flush with the under panel 35. The cover 45 is integrally molded with a support member 45a, and the support member 45a is fastened to the casing 41 with rivets or screws 46, or alternatively, with a hook (not shown) projecting from the casing 41. The cover 45 has a tear line (not shown) to be torn and open when the airbag 42 is inflated.

Brackets 47 project from side surfaces of the casing 41, and the brackets 47 are fastened to the under panel 35. A recessed section 50 extending in a front-to-rear direction of the vehicle is provided at a backside of the casing 41 (a plane opposite to the front opening covered with the cover 45). The recessed section 50 has a width substantially equal to or larger than a diameter of the steering column 30. The recessed section 50 crosses the casing 41 from an upper rim of the casing 41 (adjacent to the steering wheel 32) to a lower rim thereof. The recessed section 50 is arranged under the steering column 30 in a vertical direction.

The airbag 42 is fixed to the recessed section 50 with fastening members 47'. The recessed section 50 of the casing 41 has swell sections 51 and 52 projecting toward the rear at left and right sides thereof. A main portion of the airbag 42 is folded in the swell sections 51 and 52.

In the occupant leg protection system 40 with such a structure, the gas generator 43 generates gas, and the airbag 42 is inflated to open the cover 45, thereby being inflated into an exterior of the vehicle from the under panel 35 in the event of a car crash.

When the occupant leg plunges into the airbag 42 deployed along the under panel 35, and the under panel 35 retracts, the recessed section 50 engages the steering column 30, so that the occupant leg protection system 40 does not directly contact the steering column 30. It is possible to arrange the occupant leg protection system 40 at an upper position or a position closer to the steering column 30 by the amount corresponding to a depth of the recessed section 50 as compared with the conventional occupant leg protection system.

In the embodiment, the gas generator 43 is arranged at the swell section 51. Thus, the gas generator 43 does not contact the steering column 30 even when the occupant leg protection system 40 is retracted along with the under panel 35. Therefore, it is possible to arrange the occupant leg protection system 40 at an upper position or a position closer to the steering column 30 by the amount corresponding to the projection of the gas generator 43.

FIG. 3 is a perspective view of an occupant leg protection system seen from a rear side according to another embodiment of the present invention. In this embodiment, an occupant leg protection system 60 includes a casing 61, an airbag 62 housed in the casing 61 in a folded state, a cover (not shown) for covering a front opening of the casing 61, and a gas generator 63 for inflating the airbag 62. Brackets 64 project from the casing 61 and fix the casing 61 to the under panel 35 (not shown in FIG. 3). The airbag 62 is fastened to the casing 61 with fastening members 65.

The casing 61 has a uniform depth and does not have a recessed section corresponding to the recessed section 50 in the occupant leg protection system 40 shown in FIGS. 1 and 2.

The casing 61 is formed in an elongated box and is attached to the under panel 35. A longitudinal direction of the casing 61 is aligned with the width direction of the vehicle, and a center of the casing 61 in the longitudinal direction is located below the steering column 30.

An opening 68 is provided at one end of the backside of the casing 61 in the longitudinal direction, and a gas inlet port 62a of the airbag 62 protrudes through the opening 68 from the backside of the casing 61.

A bracket 70 projects from the backside of the casing 61. The bracket 70 is an angle member having a substantially L-shaped cross section. The gas generator 63 is fixed to the bracket 70 with fastening bands 71 and bolts (or rivets) 72. The gas generator 63 is formed in a cylindrical shape, and the gas inlet port 62a of the airbag 62 is secured to the end of the gas generator 63 with a hose band 73.

The bracket 70 and the gas generator 63 extend from the end of the casing 61 in the longitudinal direction substantially perpendicular to the backside of the casing 61. Therefore, the bracket 70 and the gas generator 63 are not positioned below the steering column 30 in the vertical direction.

In the occupant leg protection system 60, when the gas generator 63 generates the gas, the airbag 62 is inflated and deployed along the front surface of the under panel 35 for receiving the occupant's legs. Even when the under panel 35 is retracted by a pressure from the occupant's legs, the gas generator 63 and the bracket 70 do not contact the steering column 30. Accordingly, it is possible to arrange the occupant leg protection system 60 at an upper position or a position closer to the steering column 30 by an amount corresponding to the projection of the gas generator.

A recessed section corresponding to the recessed section 50 may be provided in the protection system shown in FIG. 3. In FIG. 3, the gas generator 63 is attached to the bracket 70 connected to the casing 61. The gas generator 63 may be attached to a vehicle-body member such as a reinforcement member. The gas generator and the airbag may be connected together through a duct.

The above-described embodiments are only examples of the invention and modifications may be made. For example, the arrangement, shape, and number of the gas generator may be modified from those shown in the drawings.

As described above, the invention provides the occupant leg protection system arranged at an upper position or a position closer to the steering column. When the occupant leg protection system is arranged at an upper position, it is possible to deploy and inflate the airbag from the occupant leg protection system directly ay a position close to knees of the occupant's legs, thus retraining the knees early.

While the invention has been explained with reference to the specific embodiments of the invention, the explanation is illustrative and the invention is limited only by the appended claims.

What is claimed is:

1. An occupant leg protection system arranged below a steering column of a vehicle, comprising:

an airbag;

a casing attached to the vehicle for housing the airbag and having a recessed section at a backside thereof so that the recessed section can accommodate the steering column when pushed, said casing including a first storage section and a second storage section with the recessed section in between so that one part of the airbag is stored in the first storage section and another part of the airbag is stored in the second storage section; and a gas generator attached to the casing and stored in the first storage section for inflating the airbag.

2. An occupant leg protection system according to claim 1, wherein said gas generator is attached to the casing at a position other than the recessed section.

3. An occupant leg protection system according to claim 1, wherein a rear part of the airbag is fixed to the recessed section.

4. An occupant leg protection system arranged below a steering column of a vehicle, comprising:

an airbag;

a casing attached to the vehicle for housing the airbag; and a gas generator attached to the casing for inflating the airbag at a location away from a position facing the steering column, said gas generator extending from a back surface of the casing away from the steering column.

* * * * *